(12) United States Patent
Brown

(10) Patent No.: US 7,036,669 B1
(45) Date of Patent: May 2, 2006

(54) LAUNDRY CART

(76) Inventor: Jerome Brown, 5030 Lisa Ave., San Diego, CA (US) 92102

( * ) Notice: Subject to any disclaimer, the term of this patent is extended or adjusted under 35 U.S.C. 154(b) by 0 days.

(21) Appl. No.: 09/821,314

(22) Filed: Mar. 29, 2001

(51) Int. Cl.
*A47F 7/02* (2006.01)

(52) U.S. Cl. ................................ 211/85.24; 211/85.15; 211/85.24

(58) Field of Classification Search ............ 280/87.51, 280/220, 79.5; D32/37; D34/23, 26; 414/13; 211/85.24, 85.15
See application file for complete search history.

(56) References Cited

U.S. PATENT DOCUMENTS

| | | | | |
|---|---|---|---|---|
| 5,183,280 A | * | 2/1993 | Gresch | 280/79.5 |
| 5,617,962 A | * | 4/1997 | Chen | 211/206 |
| 6,880,202 B1 | * | 4/2005 | Thompson et al. | 16/35 R |

* cited by examiner

*Primary Examiner*—Christopher P. Ellis
*Assistant Examiner*—Cynthia F. Collado
(74) *Attorney, Agent, or Firm*—Roy, Kiesel, Keegan and DeNicola

(57) ABSTRACT

A laundry cart having a conical shaped laundry basket that is shaped to prevent contact between the laundry basket and the surrounding equipment such as washing machines and dryers. The bottom of the laundry basket is provided with a padded bumper to minimize damages caused by contact.

1 Claim, 1 Drawing Sheet

LAUNDRY CART

TECHNICAL FIELD

The present invention relates to laundry accessories and more particularly to a laundry cart that includes a conical shaped laundry basket having attached swivel wheels at the bottom thereof and an incorporated hanging rod extending upwardly above the laundry basket and supported by two vertical support bars; the laundry basket having the smaller end facing upward toward the hanging rod to minimize contact between the laundry cart and the surrounding laundry equipment such as washing machines and dryers; the laundry basket having a padded bumper on the bottom sides thereof and a locking mechanism for the swivel wheels.

BACKGROUND OF INVENTION

Laundry equipment such as washing machines and dryers in laundry mats are often damages by the careless handling of laundry baskets as they bang into and damage the sides of this type of equipment. It would be a benefit, therefore, to have a laundry cart that included a laundry basket shaped to prevent contact between the laundry basket and the side walls of the laundry equipment as well as including a rubber bumper along the portion where contact could be made.

SUMMARY OF INVENTION

It is thus an object of the invention to provide a laundry cart that includes a conical shaped laundry basket having attached swivel wheels at the bottom thereof and an incorporated hanging rod extending upwardly above the laundry basket and supported by two vertical support bars; the laundry basket having the smaller end facing upward toward the hanging rod to minimize contact between the laundry cart and the surrounding laundry equipment such as washing machines and dryers; the laundry basket having a padded bumper on the bottom sides thereof and a locking mechanism for the swivel wheels.

Accordingly, a laundry cart is provided. The laundry cart includes a conical shaped laundry basket having attached swivel wheels at the bottom thereof and an incorporated hanging rod extending upwardly above the laundry basket and supported by two vertical support bars; the laundry basket having the smaller end facing upward toward the hanging rod to minimize contact between the laundry cart and the surrounding laundry equipment such as washing machines and dryers; the laundry basket having a padded bumper on the bottom sides thereof and a locking mechanism for the swivel wheels.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
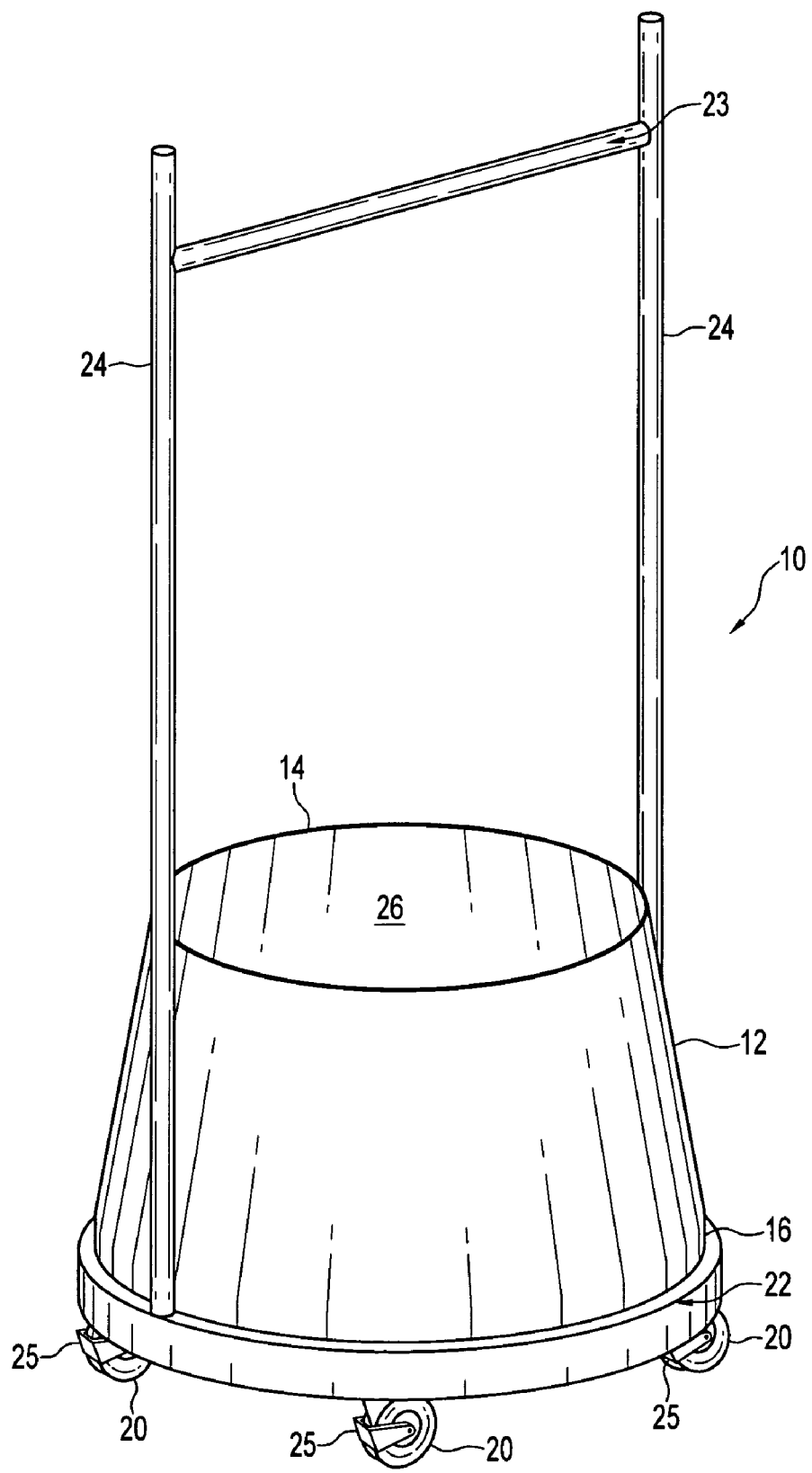
FIG. 1 shows an exemplary embodiment of the laundry cart of the present invention.

FIG. 1 shows an exemplary embodiment of the laundry cart of the present invention generally designated 10. Laundry cart 10 includes a conical shaped laundry basket generally designated 12 having a narrow diameter upper end 14 and a larger diameter bottom end 16 to which four swivel wheels 20 are mechanically connected. A rubber bumper 22 is provided around the circumference of bottom end 16 and a goal post shaped hanging rod assembly including a horizontally oriented hanging rod 22 supported by two vertical support bars 24 extend upwardly from conical shaped laundry basket 12 such that hanging rod is positioned above the opening 26 to laundry basket 12.

It can be seen from the preceding description that a laundry cart has been provided.

It is noted that the embodiment of the laundry cart described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:
1. A laundry cart comprising:
a conical shaped laundry basket having attached swivel wheels at the bottom thereof and an incorporated hanging rod extending upwardly above the laundry basket and supported by two vertical support bars;
the laundry basket having the smaller end facing upward toward the hanging rod to minimize contact between the laundry cart and any surrounding laundry equipment;
the laundry basket having a padded bumper on the bottom thereof and a locking mechanism for the swivel wheels.

* * * * *